US012340744B2

(12) United States Patent
Lee et al.

(10) Patent No.: US 12,340,744 B2
(45) Date of Patent: Jun. 24, 2025

(54) PIXEL CIRCUIT AND DISPLAY DEVICE INCLUDING THE SAME

(71) Applicant: LG DISPLAY CO., LTD., Seoul (KR)

(72) Inventors: Dong Gun Lee, Paju-si (KR); Kyu Jin Kim, Paju-si (KR); Ji Ah Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 10 days.

(21) Appl. No.: 18/220,078

(22) Filed: Jul. 10, 2023

(65) Prior Publication Data

US 2024/0221645 A1 Jul. 4, 2024

(30) Foreign Application Priority Data

Dec. 29, 2022 (KR) ........................ 10-2022-0188933

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/08* (2013.01); *G09G 2320/0223* (2013.01)

(58) Field of Classification Search
CPC ......... G09G 3/30–3291; G09G 2340/04–0457
See application file for complete search history.

(56) References Cited

U.S. PATENT DOCUMENTS

2017/0256200 A1* 9/2017 Duan .................. G09G 3/3233
2018/0286307 A1* 10/2018 Kim ..................... G09G 3/3283
2020/0286432 A1* 9/2020 Zhang .................. G09G 3/3258
2021/0359073 A1* 11/2021 Cha ..................... H01L 27/1225

FOREIGN PATENT DOCUMENTS

KR 10-2021-0085089 A 7/2021
KR 10-2348869 A 1/2022
KR 10-2022-0023176 A 3/2022

* cited by examiner

*Primary Examiner* — Hang Lin
(74) *Attorney, Agent, or Firm* — Birch, Stewart, Kolasch & Birch, LLP

(57) ABSTRACT

A pixel circuit and a display device including the same are discussed. The pixel circuit can include a first pixel circuit arranged in a first area of a screen at a first resolution and including a first driving element to supply a current to a first light-emitting element and a first storage capacitor disposed between a gate electrode of the first driving element and a power line to which a high-potential supply voltage is applied, and a second pixel circuit arranged in a second area of the screen at a second resolution and including a second driving element to supply a current to a second light-emitting element and a second storage capacitor disposed between a gate electrode of the second driving element and the power line to which the high-potential supply voltage is applied.

20 Claims, 16 Drawing Sheets

【FIG. 1】
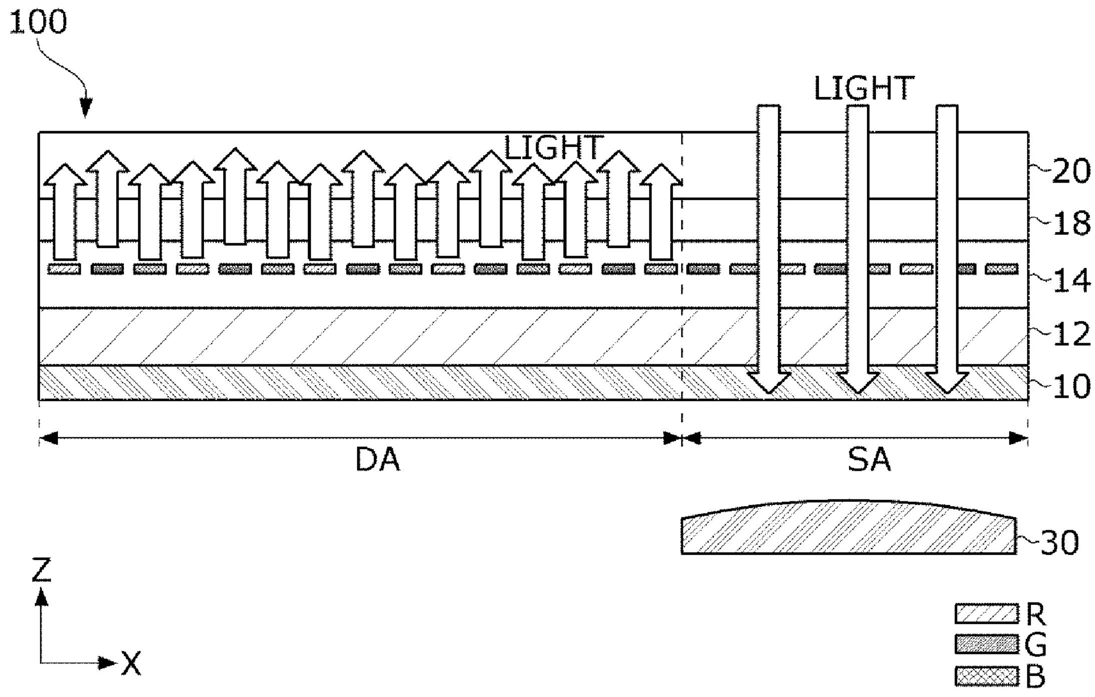

【FIG. 2】
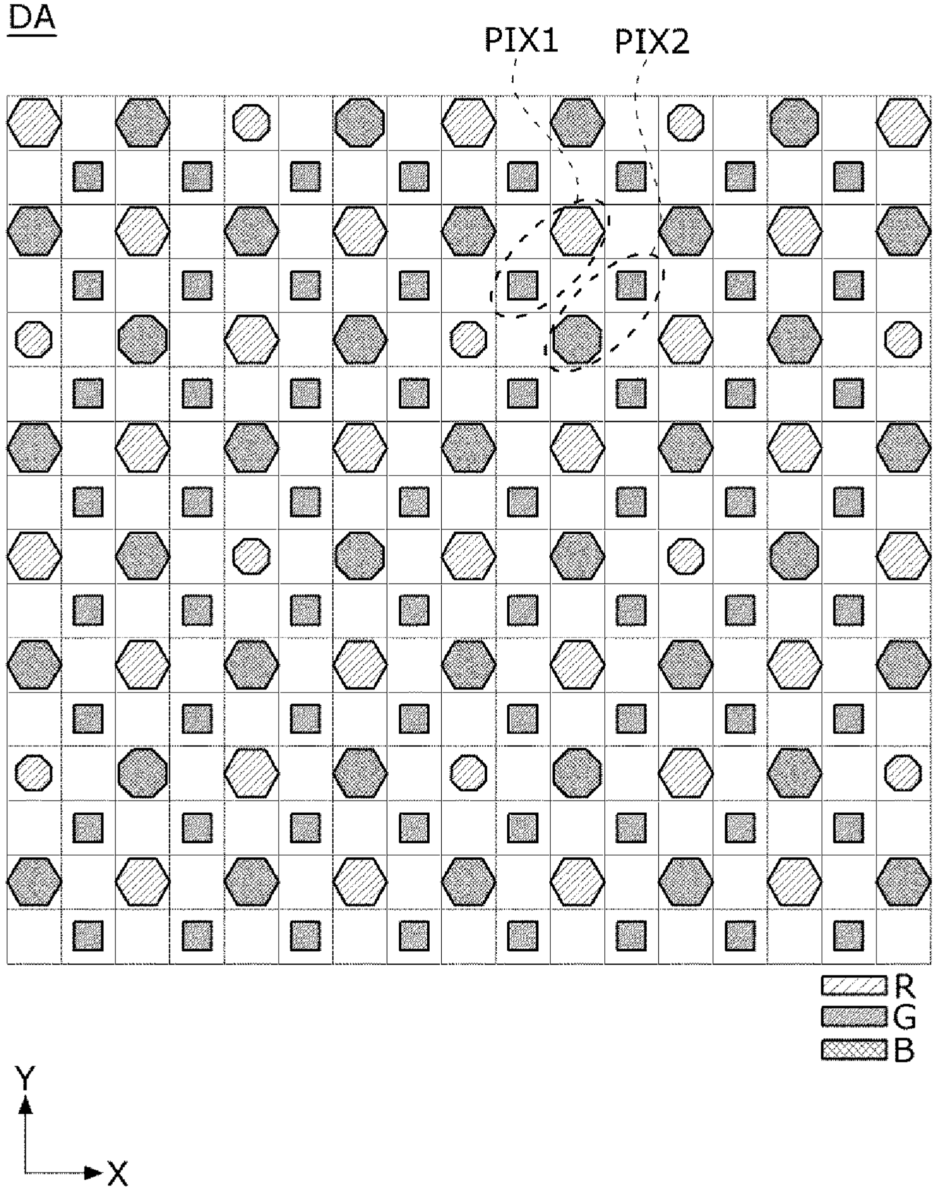

【FIG. 3】
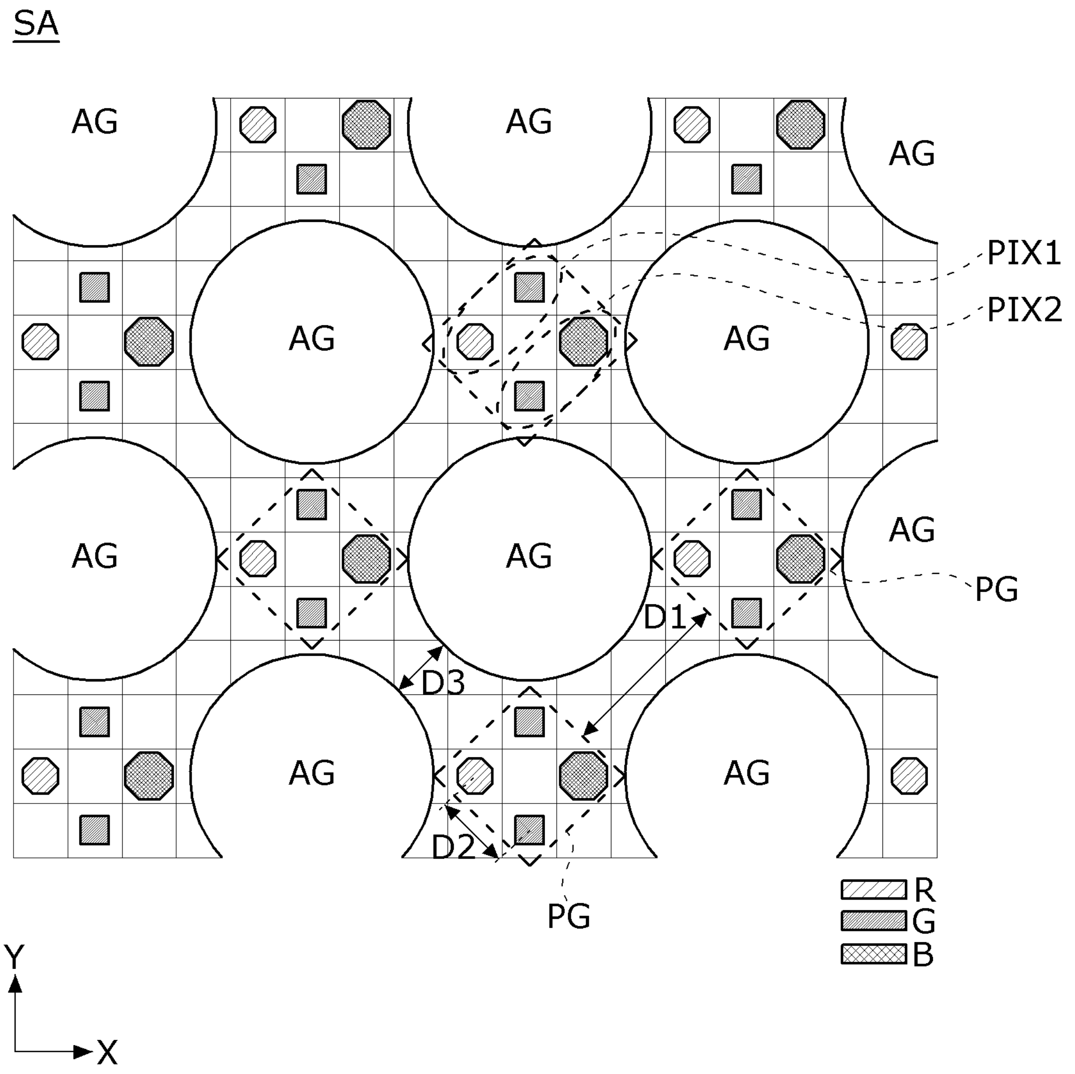

【FIG. 4】
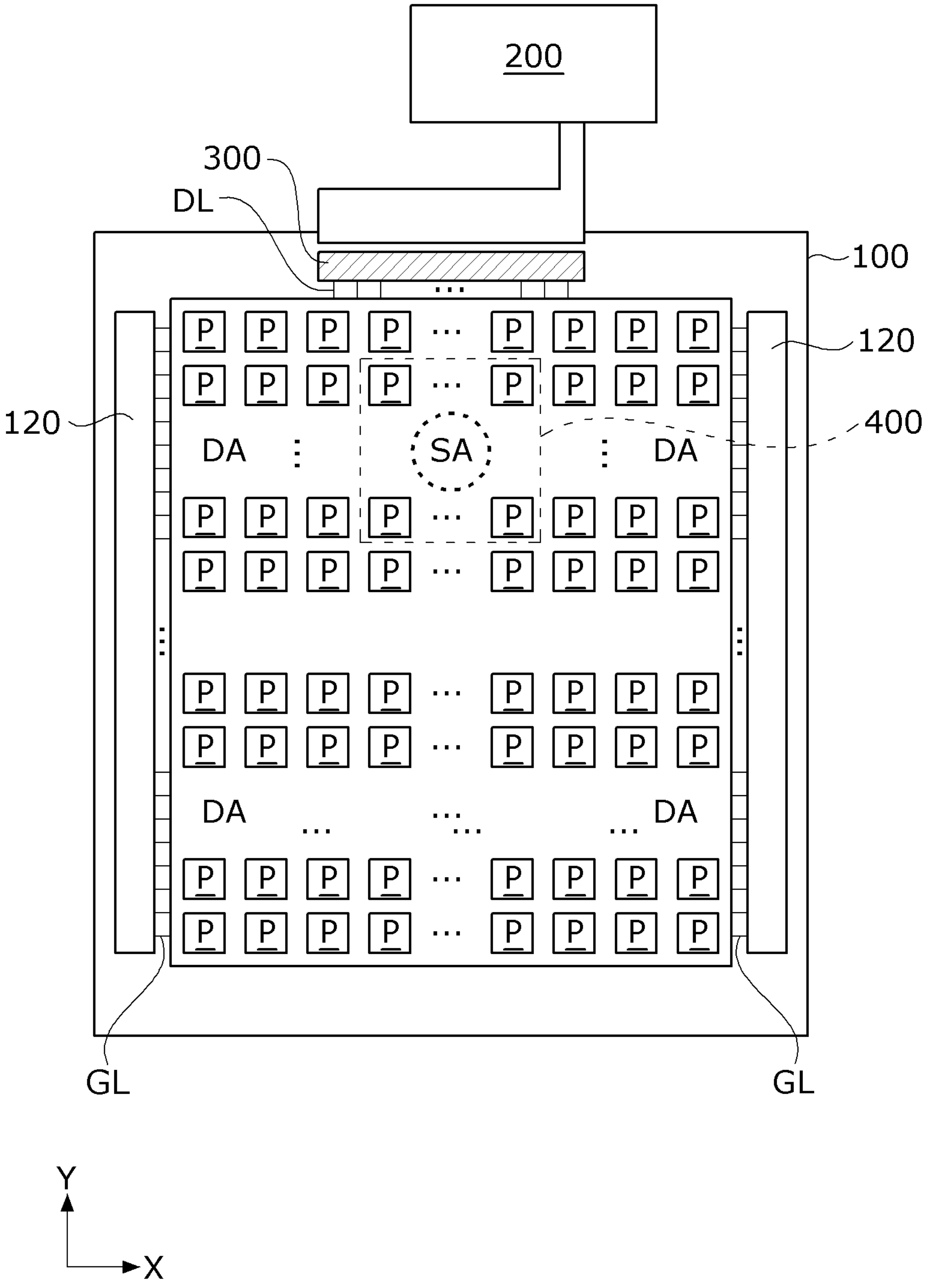

【FIG. 5】
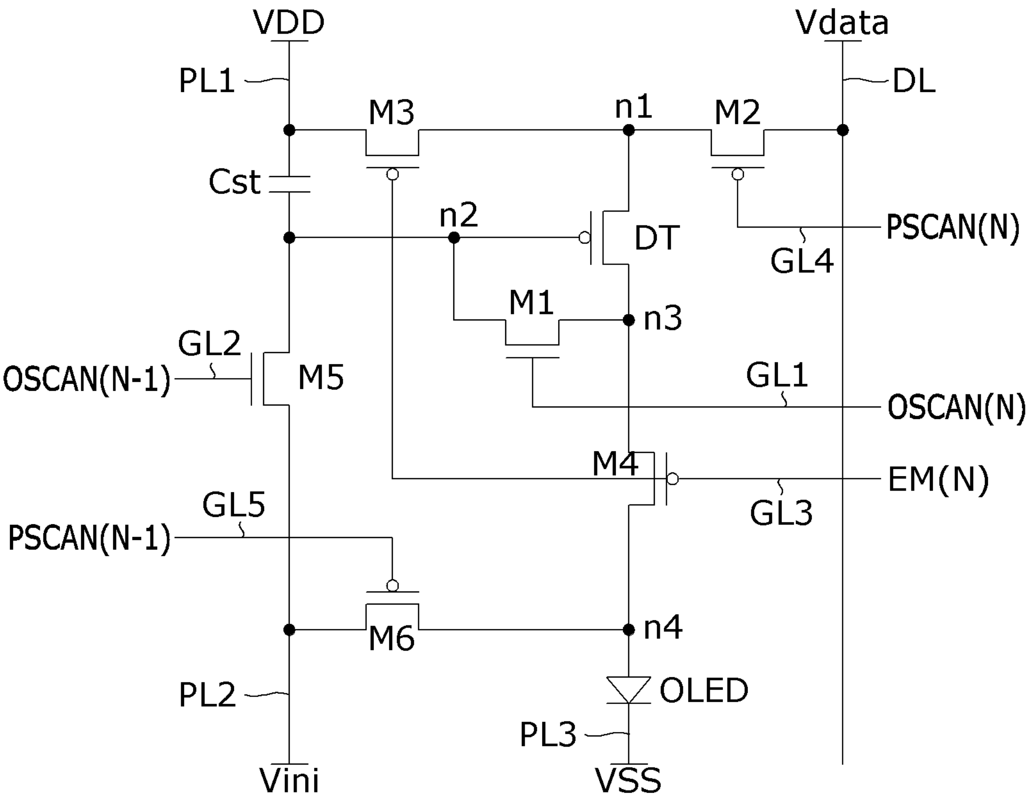

【FIG. 6】
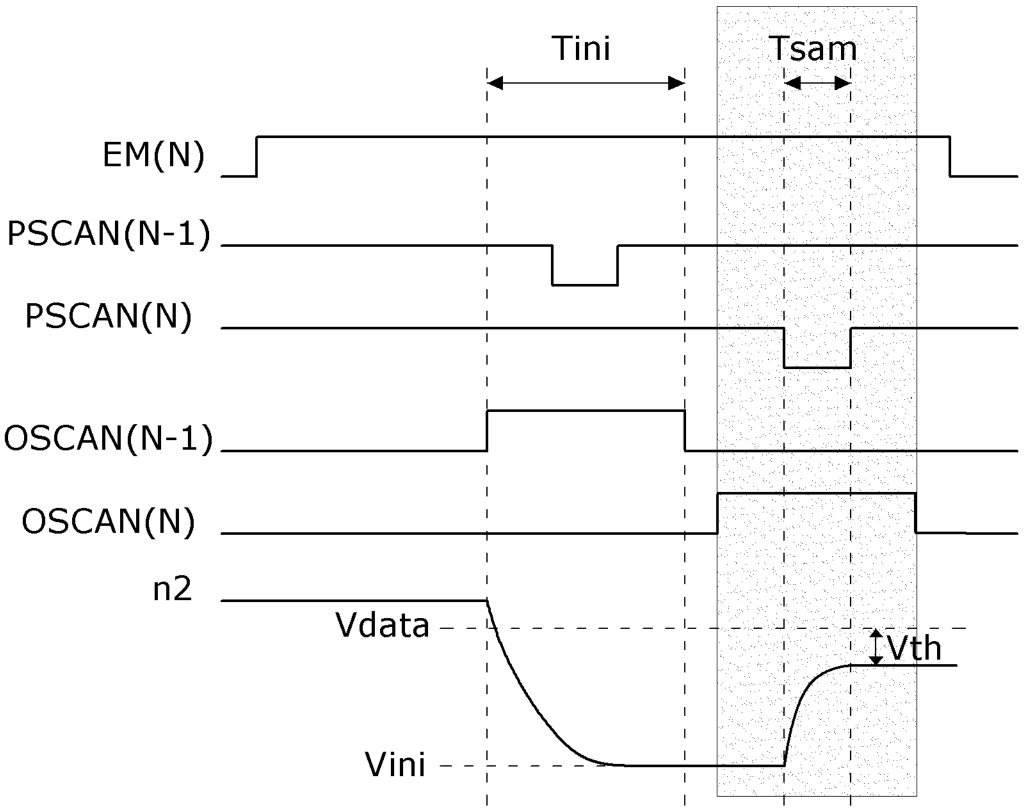

【FIG. 7A】
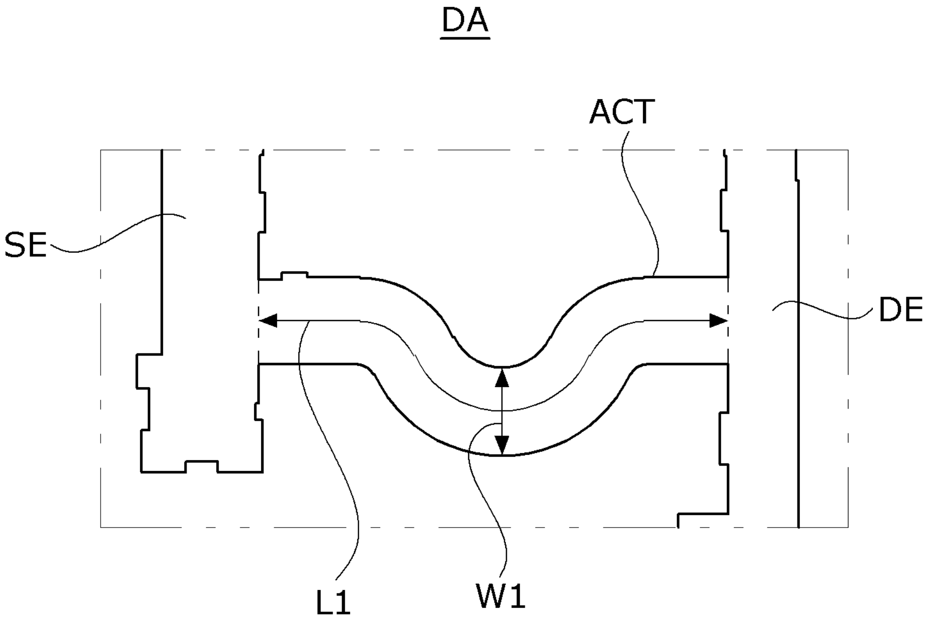
【FIG. 7B】
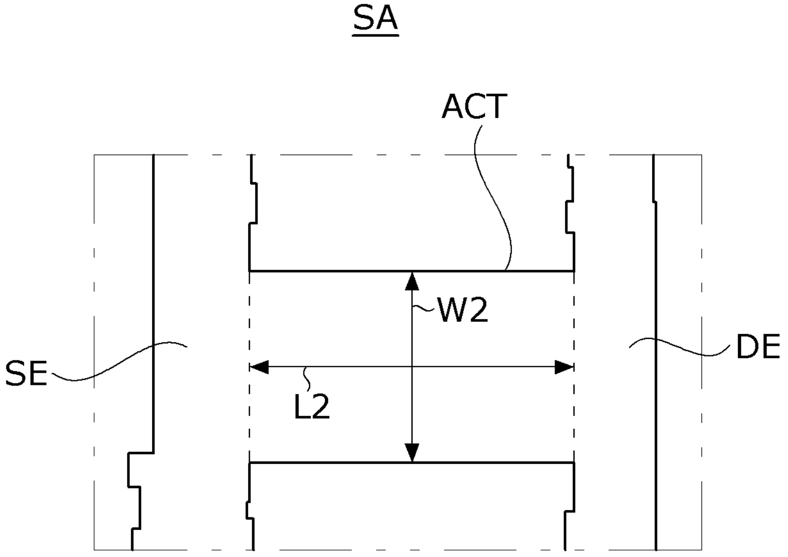

【FIG. 8A】
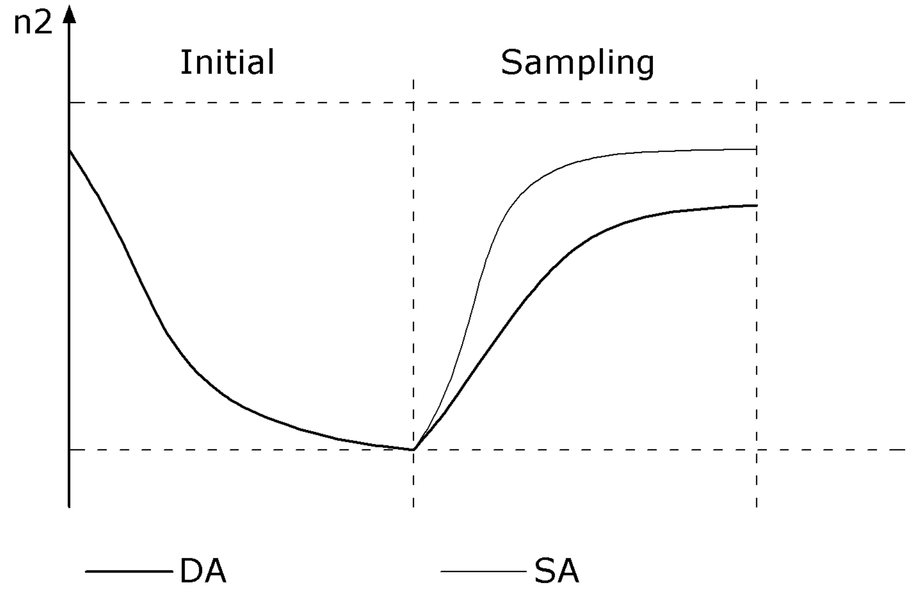
【FIG. 8B】
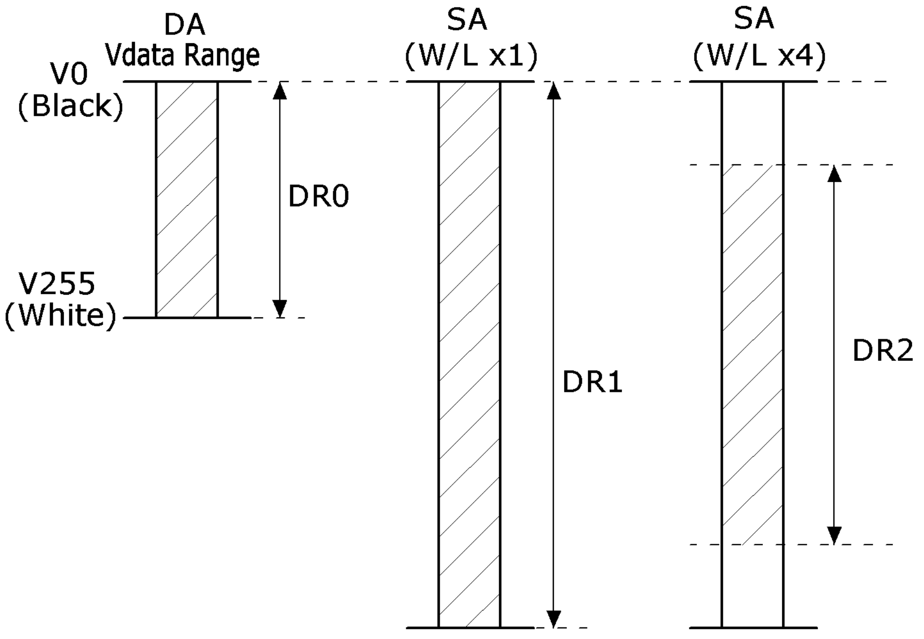

【FIG. 8C】
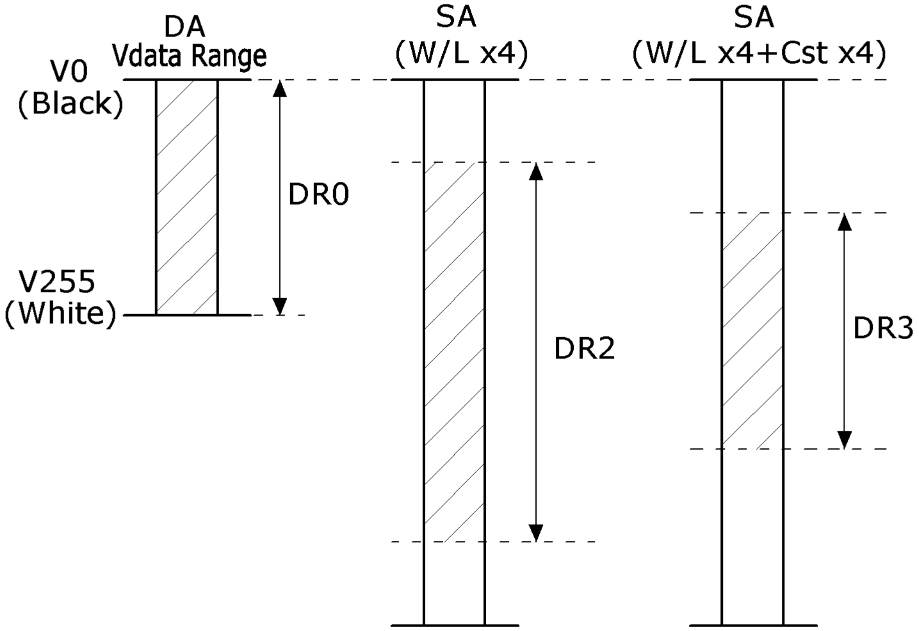

【FIG. 9A】
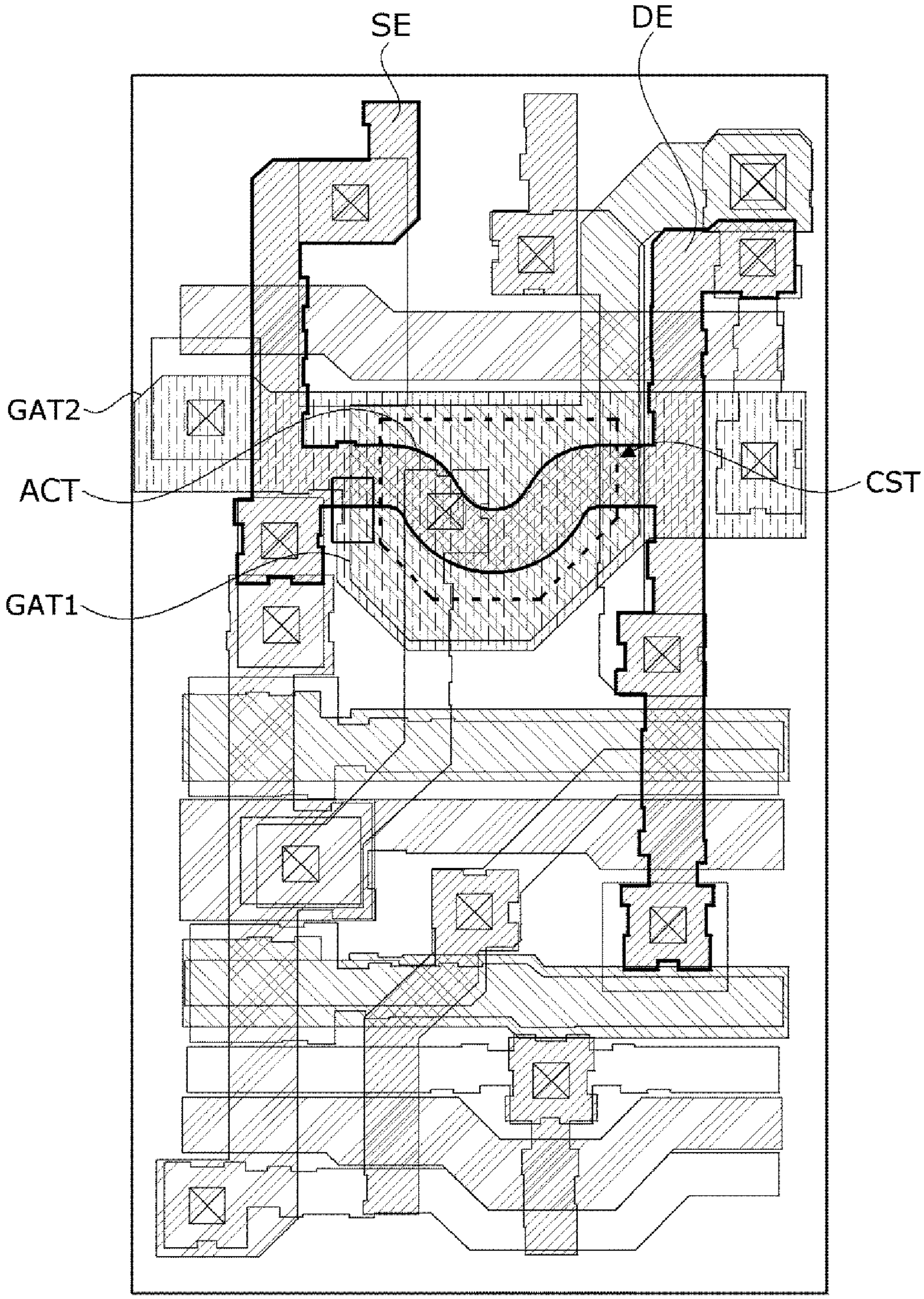

【FIG. 9B】
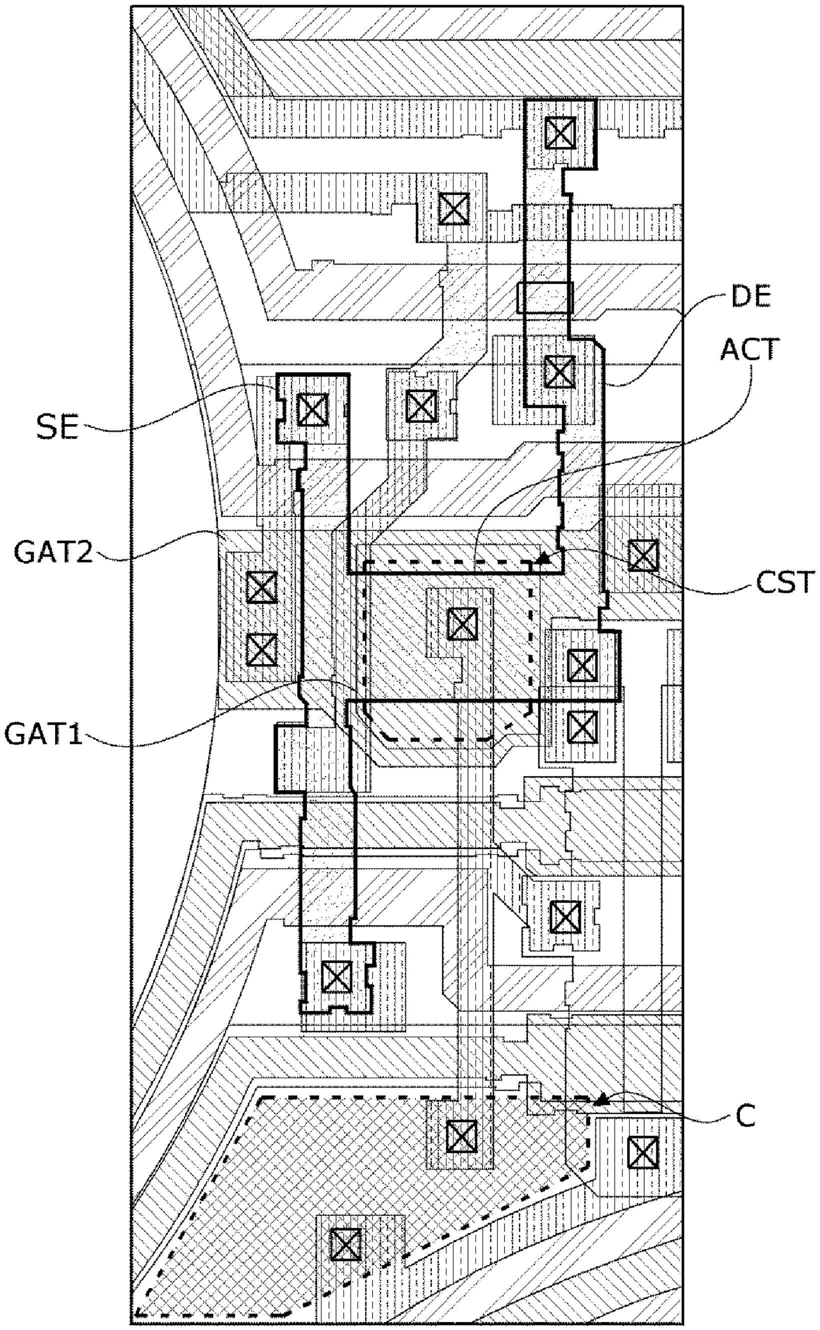

【FIG. 9C】
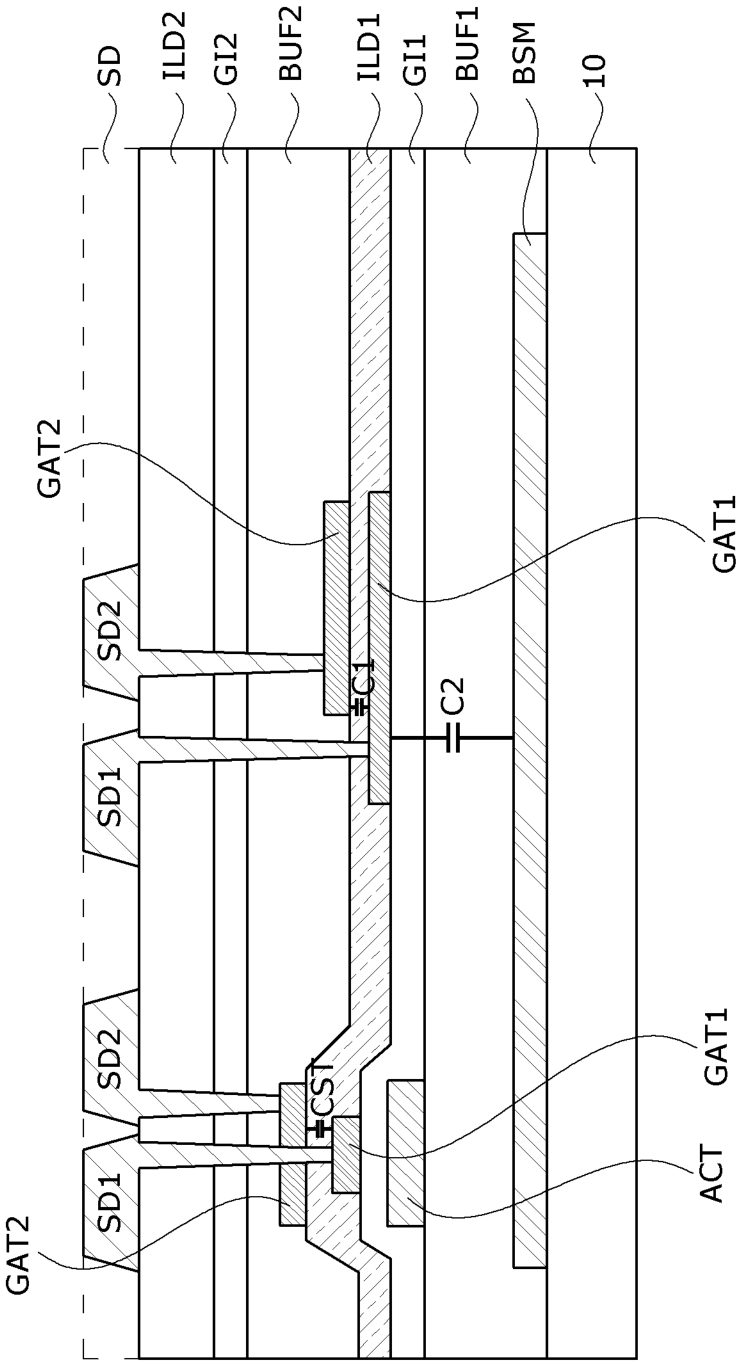

【FIG. 9D】
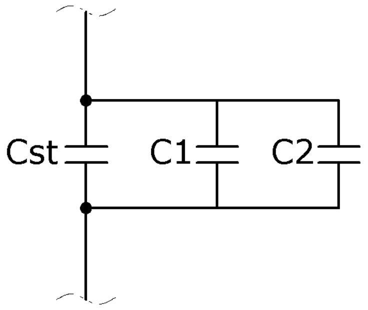
【FIG. 10】
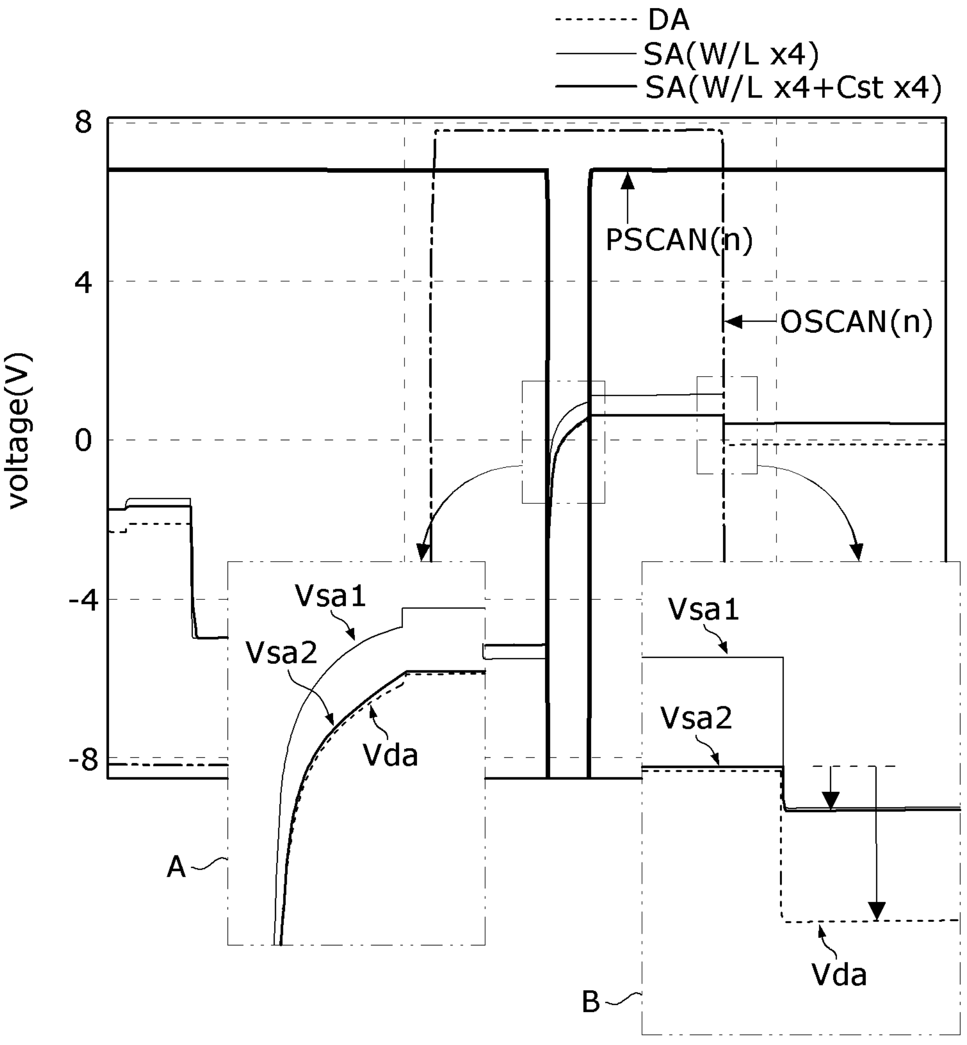

【FIG. 11】
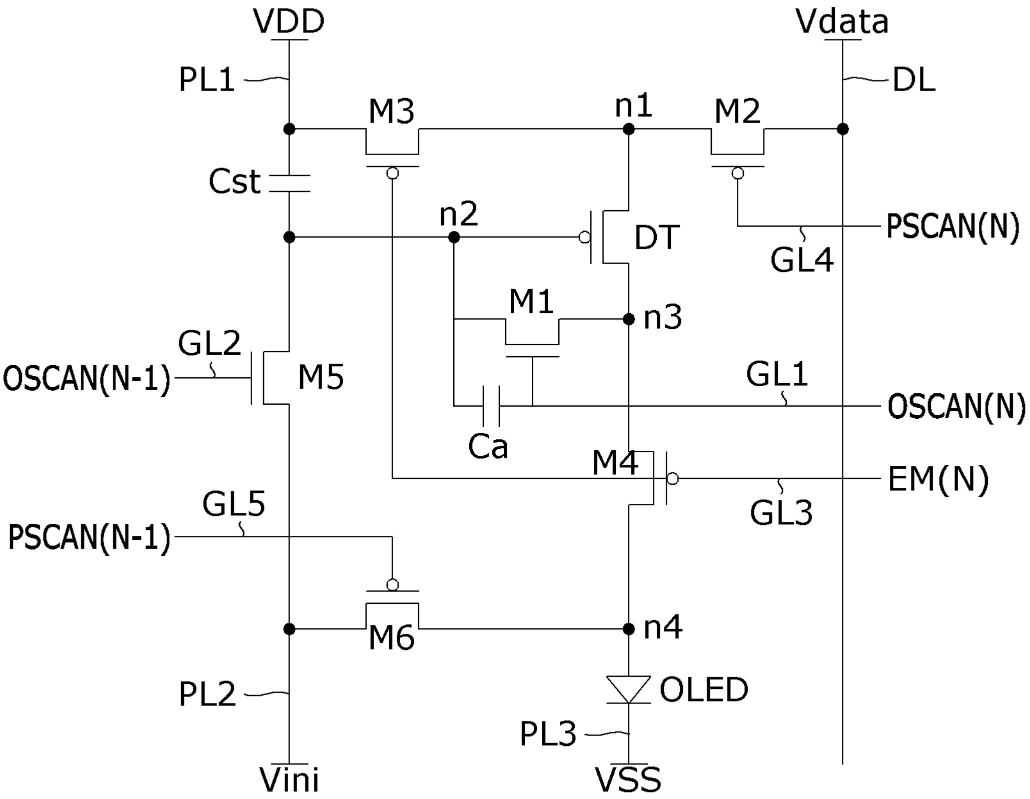

【FIG. 12】
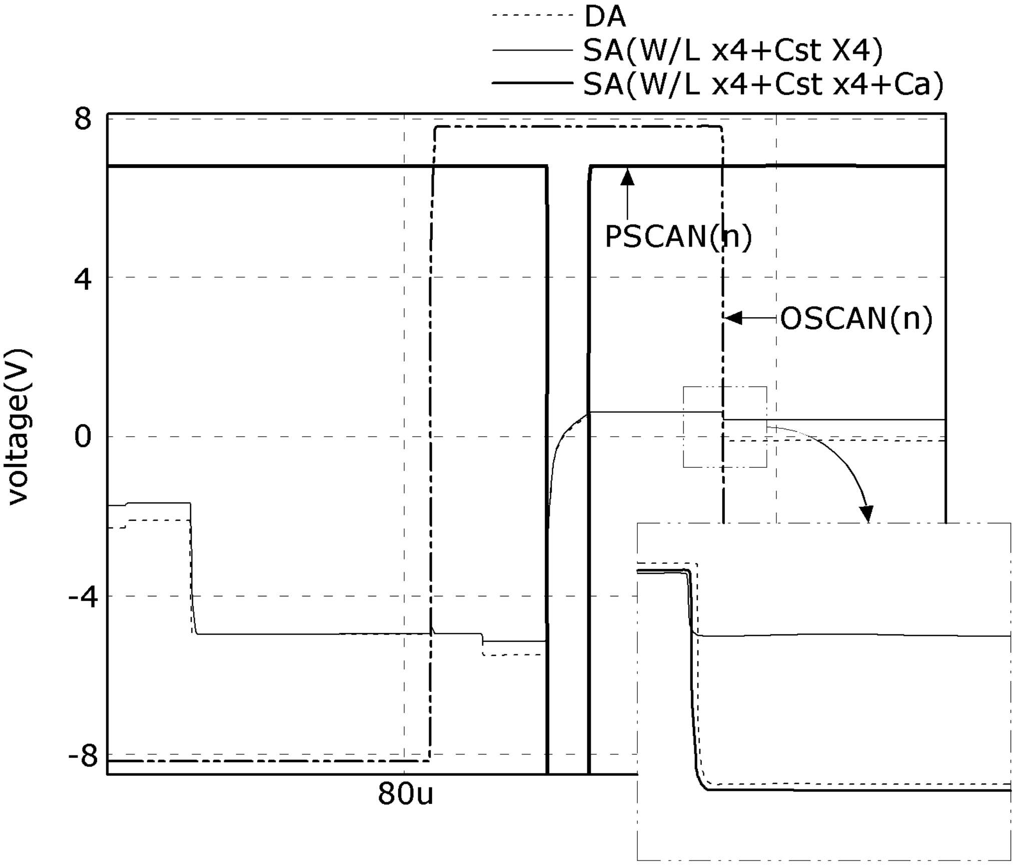

【FIG. 13】
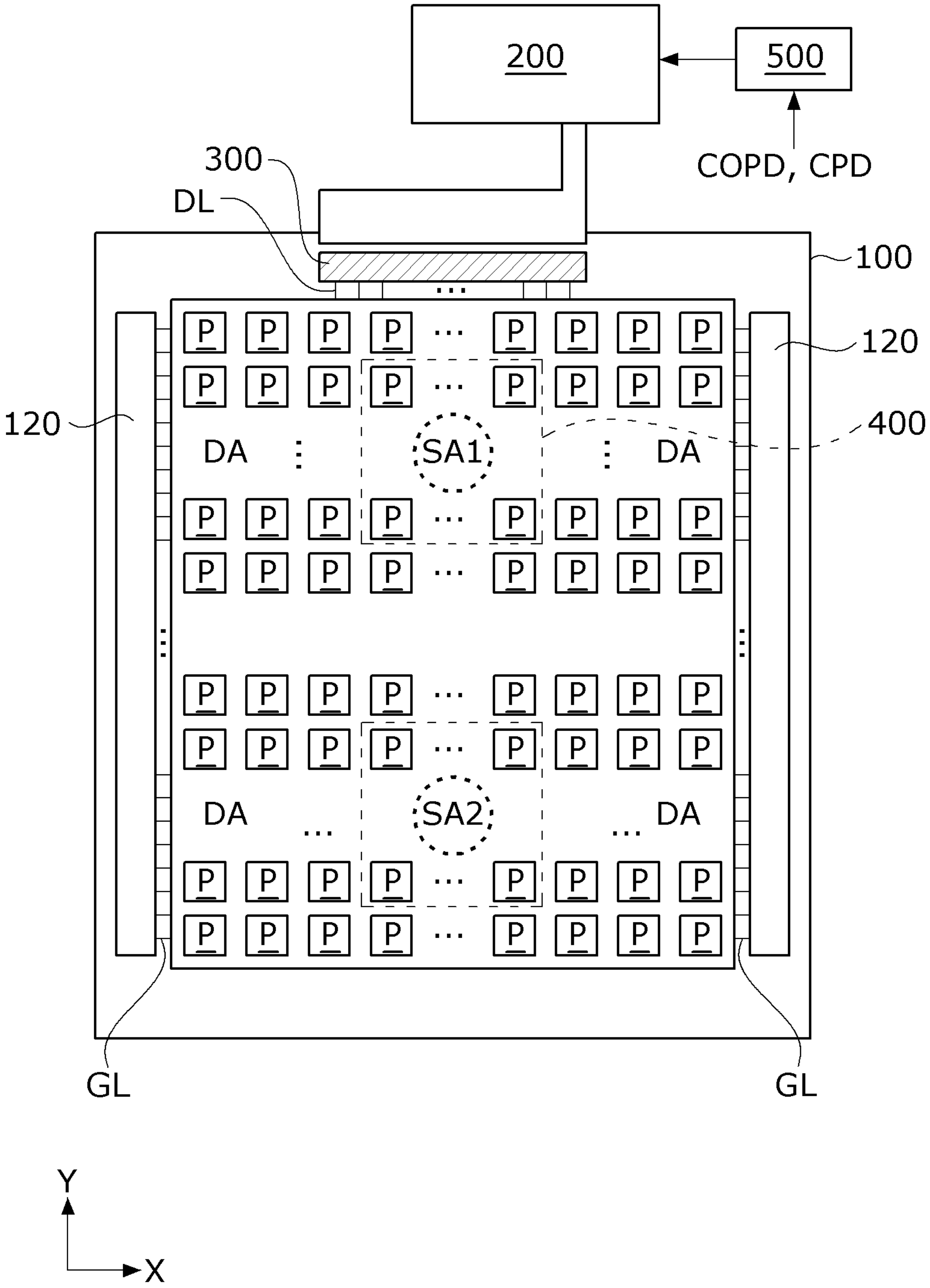

PIXEL CIRCUIT AND DISPLAY DEVICE INCLUDING THE SAME

CROSS-REFERENCE TO RELATED APPLICATION

This application claims priority to Korean Patent Application No. 10-2022-0188933, filed in the Republic of Korea on Dec. 29, 2022, the entire contents of which are hereby expressly incorporated by reference into the present application.

BACKGROUND

1. Field

The present disclosure relates to a pixel circuit and a display device including the same.

2. Discussion of Related Art

An electroluminescence display device is broadly classified into an inorganic light emitting display device and an organic light emitting display device according to a material of a light emitting layer.

An active-matrix type organic light emitting display device includes an organic light emitting diode (hereinafter, referred to as "OLED") which emits light by itself, and has an advantage of a quick response time, high luminous efficiency, high luminance, and a wide viewing angle. In the organic light emitting display device, the OLED is formed in each pixel. Since a black gray level can be expressed as perfect black in the organic light emitting display device, a contrast ratio and color gamut of such display device are excellent.

Further, multi-media functions of a mobile device have been improved. For example, a camera is basically built-in to a smart phone, and the resolution of the camera in the smart phone has increased to a level of that of a conventional digital camera. However, a front camera of the smart phone can limit a screen design, and thus the screen design can become challenging. In order to reduce a space occupied by the camera in the smart phone, a screen design including a notch or a punch hole has been adopted in the smart phone, but since a screen size can then be still limited due to the camera, implementation of a full-screen display can be challenging.

In order to realize the full-screen display, a method of providing a sensing region where pixels of a low pixels per inch (PPI) are disposed in a screen of a display panel, and disposing a camera at a position opposite the sensing region under the display panel is proposed. A sensing area of the screen functions as a transparent display that displays an image.

In this case, in order to minimize the effects which can be caused by the current characteristics of a display area and a sensing area and external noise, a channel width and length of a transistor in a pixel circuit can be changed according to a resolution ratio to set data ranges of these areas to be substantially the same. However, when the channel width and length of the transistor are changed, a charging rate of a capacitor can change, which can result in a deviation between the data ranges of the display area and the sensing area.

SUMMARY OF THE DISCLOSURE

The present disclosure is directed to solving or addressing at least one or more of the above-described limitations and needs associated with the related art.

The present disclosure provides a pixel circuit for equalizing data ranges and a display device including the same.

It should be noted that objects of the present disclosure are not limited to the above-described objects, and other objects of the present disclosure will be apparent to those skilled in the art from the following descriptions.

According to an aspect of the present disclosure, a pixel circuit includes a first pixel circuit arranged in a first area of a screen at a first resolution and including a first driving element configured to supply a current to a first light-emitting element and a first storage capacitor disposed between a gate electrode of the first driving element and a power line to which a high-potential supply voltage is applied; and a second pixel circuit arranged in a second area of the screen at a second resolution and including a second driving element configured to supply a current to a second light-emitting element and a second storage capacitor disposed between a gate electrode of the second driving element and the power line to which the high-potential supply voltage is applied, in which a second channel ratio of the second driving element is greater than a first channel ratio of the first driving element, and a second capacity of the second storage capacitor is greater than a first capacity of the first storage capacitor.

According to an aspect of the present disclosure, a display device includes a display panel in which a plurality of pixel circuits are arranged in a first area and a second area of a screen at different resolutions, in which the plurality of pixel circuits includes a first pixel circuit arranged in the first area at a first resolution and including a first driving element configured to supply a current to a first light-emitting element and a first storage capacitor disposed between a gate electrode of the first driving element and a power line to which a high-potential supply voltage is applied, and a second pixel circuit arranged in the second area at a second resolution and including a second driving element configured to supply a current to a second light-emitting element and a second storage capacitor disposed between a gate electrode of the second driving element and the power line to which the high-potential supply voltage is applied, and a second capacity of the second storage capacitor is greater than a first capacity of the first storage capacitor.

According to the present disclosure, a channel ratio of a channel width to a channel length of a driving element and the capacity of a storage capacitor in each of a display area and a sensing area in which a plurality of pixel circuits are arranged at different resolutions can be adjusted to equalize charging rates of the storage capacitors in the two areas, thereby equalizing data ranges.

According to the present disclosure, when the data ranges are identical to each other, the influence of noise generated due to IR drop or kickback can decrease, an analog voltage margin can be secured unlike the conventional case, and a compensation margin (e.g., a data up/down compensation margin) of each IP (Inflection Point) for removing an in-plane deviation can be secured.

According to the present disclosure, low-power driving can be performed by equalizing data ranges within the same charging time.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a schematic cross-sectional view of a display panel according to an embodiment of the present disclosure;

FIG. 2 is a diagram illustrating an example of an arrangement of pixels in a display area according to an embodiment of the present disclosure;

FIG. 3 is a diagram illustrating examples of pixels and a light-transmitting part of a sensing area according to an embodiment of the present disclosure;

FIG. 4 is a diagram illustrating an overall configuration of a display device according to a first embodiment of the present disclosure;

FIG. 5 is a circuit diagram of an example of a pixel circuit to which an internal compensation circuit is applied according to an embodiment of the present disclosure;

FIG. 6 is a diagram illustrating a driving timing of the pixel circuit of FIG. 5;

FIGS. 7A and 7B are diagrams for describing a comparison between a channel width and length of a transistor according to an embodiment of the present disclosure;

FIGS. 8A to 8C are diagrams for describing a data range according to design parameters according to an embodiment of the present disclosure;

FIGS. 9A to 9D are diagrams for describing a pixel structure in which a channel ratio and a capacity are adjusted according to an embodiment of the present disclosure;

FIG. 10 is a diagram illustrating a result of simulating a charging rate of a pixel circuit according to an embodiment of the present disclosure;

FIG. 11 is a circuit diagram of another example of a pixel circuit to which an internal compensation circuit is applied according to an embodiment of the present disclosure;

FIG. 12 is a diagram illustrating a result of simulating a charging rate of a pixel circuit according to another embodiment of the present disclosure; and FIG. 13 is a diagram illustrating an overall configuration of a display device according to a second embodiment of the present disclosure.

DETAILED DESCRIPTION OF THE EMBODIMENTS

The advantages and features of the present disclosure and methods for accomplishing the same will be more clearly understood from embodiments described below with reference to the accompanying drawings. However, the present disclosure is not limited to the following embodiments but can be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies can be omitted to avoid unnecessarily obscuring the subject matter of the present disclosure.

The terms such as "comprising," "including," "having," etc. used herein are generally intended to allow other components to be added unless the terms are used with the term "only." Any references to singular can include plural unless expressly stated otherwise.

Components are interpreted to include an ordinary error range even if not expressly stated.

When the position relation between two components is described using the terms such as "on," "above," "below," and "next," one or more components can be positioned between the two components unless the terms are used with the term "immediately" or "directly."

The terms "first," "second," and the like can be used to distinguish components from each other and may not define order or sequence, but the functions or structures of the components are not limited by ordinal numbers or component names in front of the components.

The same reference numerals can refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings. All the components of each display panel and each display apparatus according to all embodiments of the present disclosure are operatively coupled and configured.

In embodiments of the present disclosure, when the first resolution is referred to as a high resolution, and the second resolution is referred to as a low resolution, an area in which pixels are arranged at the low resolution is named a sensing area. Here, the sensing area includes at least one of a sensing area including a camera module or an infrared sensor and a sensing area including a fingerprint recognition module, but the present disclosure is not limited thereto. Such a sensing area is an area designed to have a resolution lower than that of a display area.

FIG. 1 is a sectional view schematically illustrating a display panel according to an embodiment of the present disclosure, FIG. 2 is a view illustrating an example of pixel arrangement in a display area DA according to an embodiment of the present disclosure, and FIG. 3 is a view illustrating an example of a pixel and a light transmitting part in a sensing area SA. In FIGS. 2 and 3, wiring connected to pixels is omitted.

Referring to FIGS. 1 and 3, a screen of a display panel 100 includes at least a display area DA in which pixels are arranged at a high resolution and a sensing area SA in which pixels are arranged at a low resolution. Here, the area in which the pixels are arranged at the high resolution, for example, a high-resolution area, can include an area in which the pixels are arranged at a high pixels per inch (PPI), for example, a high PPI area, and the area in which the pixels are arranged at the low resolution, for example, a low-resolution area, can include an area in which the pixels are arranged at a low PPI, for example, a low PPI area.

The display area DA and the sensing area SA include a pixel array in which pixels in which pixel data is written are arranged. The number of pixels per unit area, for example, the PPI, of the sensing area SA is lower than the PPI of the display area DA in order to secure the transmittance of the sensing area SA.

The pixel array of the display area DA includes a pixel area (first pixel area) in which a plurality of pixels having a high PPI are arranged. The pixel array of the sensing area SA includes a pixel area (second pixel area) in which a plurality of pixel groups PG spaced by the light transmitting part and thus having a relatively low PPI are arranged. In the sensing area SA, external light can pass through the display panel 100 through the light transmitting part having a high light transmittance and can be received by an imaging element module below the display panel 100.

Since the display area DA and the sensing area SA include pixels, an input image is reproduced on the display area DA and the sensing area SA.

Each of the pixels of the display area DA and the sensing area SA include sub-pixels having different colors to realize the color of the image. The sub-pixels can include include a red sub-pixel (hereinafter, referred to as an "R sub-pixel"), a green sub-pixel (hereinafter, referred to as a "G sub-pixel"), and a blue sub-pixel (hereinafter, referred to as a "B sub-pixel"). Each of pixels P can further include a white sub-pixel (hereinafter, a "W sub-pixel"). Each of the sub-pixels can include a pixel circuit and a light emitting element OLED.

The sensing area SA includes the pixels and the imaging element module disposed below the screen of the display panel 100. A lens 30 of the imaging element module displays an input image by writing pixel data of the input image in the pixels of the sensing area SA in a display mode. The imaging element module captures an external image in an imaging mode and outputs a picture or moving image data. The lens 30 of the imaging element module faces the sensing area SA. The external light is incident on the lens 30 of the imaging element module, and the lens 30 collects the light in an image sensor that is omitted in the drawings. The imaging element module captures an external image in the imaging mode and outputs a picture or moving image data.

In order to secure the transmittance, an image quality compensation algorithm for compensating for the luminance and color coordinates of pixels in the sensing area SA can be applied due to pixels removed from the sensing area SA.

In the present disclosure, since the low-resolution pixels are arranged in the sensing area SA, a display area of the screen is not limited in relation to the imaging element module, and thus a full-screen display can be implemented.

The display panel 100 has a width in an X-axis direction, a length in a Y-axis direction, and a thickness in a Z-axis direction. The display panel 100 includes a circuit layer 12 disposed on a substrate 10 and a light emitting element layer 14 disposed on the circuit layer 12. A polarizing plate 18 can be disposed on the light emitting element layer 14, and a cover glass 20 can be disposed on the polarizing plate 18.

The circuit layer 12 can include a pixel circuit connected to wirings such as data lines, gate lines, and power lines, a gate drive part connected to the gate lines, and the like. The circuit layer 12 can include circuit elements such as a transistor implemented as a thin film transistor (TFT) and a capacitor. The wirings and circuit elements of the circuit layer 12 can be formed of a plurality of insulating layers, two or more metal layers separated with the insulating layers therebetween, and an active layer including a semiconductor material.

The light emitting element layer 14 can include a light emitting element driven by the pixel circuit. The light emitting element can be implemented as an organic light emitting diode (OLED). The OLED includes an organic compound layer formed between an anode and a cathode. The organic compound layer can include a hole injection layer HIL, a hole transport layer HTL, an emission layer EML, an electron transport layer ETL, and an electron injection layer EIL, but the present disclosure is not limited thereto. When a voltage is applied to the anode and the cathode of the OLED, holes passing through the hole transport layer HTL and electrons passing through the electron transport layer ETL are moved to the emission layer EML to form excitons, and thus visible light is emitted from the emission layer EML. The light emitting element layer 14 can be disposed on pixels that selectively transmit light having red, green, and blue wavelengths and can further include a color filter array.

The light emitting element layer 14 can be covered with a protective film, and the protective film can be covered with an encapsulation layer. The protective layer and the encapsulation layer can have a structure in which an organic film and an inorganic film are alternately stacked. The inorganic film blocks permeation of moisture or oxygen. The organic film planarizes the surface of the inorganic film. When the organic film and the inorganic film are stacked in multiple layers, a movement path of the moisture or oxygen is longer than that of a single layer, and thus the permeation of the moisture/oxygen affecting the light emitting element layer 14 can be effectively blocked.

The polarizing plate 18 can adhere to the encapsulation layer. The polarizing plate 18 improves outdoor visibility of the display device. The polarizing plate 18 reduces an amount of light reflected from the surface of the display panel 100, blocks the light reflected from metal of the circuit layer 12, and thus improves the brightness of pixels. The polarizing plate 18 can be implemented as a polarizing plate, in which a linear polarizing plate and a phase delay film are bonded to each other, or a circular polarizing plate.

In the display panel of the present disclosure, each pixel area of the display area DA and the sensing area SA includes a light shielding layer. The light shielding layer is removed from the light transmitting part of the sensing area to define the light transmitting part. The light shielding layer includes an opening hole corresponding to a light transmitting part area. The light shielding layer is removed from the opening hole. The light shielding layer is formed of a metal or inorganic film having a lower absorption coefficient than that of the metal removed from the light transmitting part with respect to the wavelength of a laser beam used in a laser ablation process of removing a metal layer present in the light transmitting part.

Referring to FIG. 2, the display area DA includes pixels PIX1 and PIX2 arranged in a matrix form. Each of the pixels PIX1 and PIX2 can be implemented as a real type pixel in which the R, G, and B sub-pixels of three primary colors are formed as one pixel. Each of the pixels PIX1 and PIX2 can further include the W sub-pixel that is omitted in the drawings. Further, two sub-pixels can be configured as one pixel using a sub-pixel rendering algorithm. For example, the first pixel PIX1 can be configured as R and G sub-pixels, and the second pixel PIX2 can be configured as B and G sub-pixels. Insufficient color representation in each of the pixels PIX1 and PIX2 can be compensated for by an average value of corresponding color data between adjacent pixels.

Referring to FIG. 3, the sensing area SA includes pixel groups PG spaced apart from each other by a predetermined distance D1 and light transmitting parts AG arranged between the adjacent pixel groups PG. The external light is received by the lens 30 of the imaging element module through the light transmitting parts AG. The light transmitting parts AG can include transparent media having high transmittance without a metal so that light can be incident with minimum light loss. In other words, the light transmitting parts AG can be formed of transparent insulating materials without including metal lines or pixels. The transmittance of the sensing area SA becomes higher as the light transmitting parts AG becomes larger.

The pixel group PG can include one or two pixels. Each of the pixels of the pixel group PG can include two to four sub-pixels. For example, one pixel in the pixel group PG can include R, G, and B sub-pixels or can include two sub-pixels and can further include a W sub-pixel. In an example of FIG. 3, the first pixel PIX1 is configured as R and G sub-pixels, and the second pixel PIX2 is configured as B and G sub-pixels, but the present disclosure is not limited thereto.

A distance D3 between the light transmitting parts AG is smaller than a distance D1 between the pixel groups PG. A distance D2 between the sub-pixels is smaller than the distance D1 between the pixel groups PG.

The shape of the light transmitting parts AG is illustrated as a circular shape in FIG. 3, but the present disclosure is not limited thereto. For example, the light transmitting parts AG can be designed in various shapes such as a circle, an ellipse, and a polygon. The light transmitting parts AG can be defined as areas in the screen from which all metal layers are removed.

FIG. 4 is a diagram illustrating an overall configuration of a display device according to a first embodiment of the present disclosure.

Referring to FIG. 4, the display device according to the first embodiment of the present disclosure includes the display panel 100 in which the pixel array is disposed on the screen, a display panel driver that drives the display panel 100, and the like.

The pixel array of the display panel 100 includes data lines DL, gate lines GL intersecting the data lines DL, and pixels P defined by the data lines DL and the gate lines GL and arranged in a matrix form. The pixel array further includes power lines such as a VDD line PL1, a Vini line PL2, and a VSS line PL3 shown in FIG. 5.

As illustrated in FIG. 1, the pixel array can be divided into the circuit layer 12 and the light emitting element layer 14. A touch sensor array can be disposed on the light emitting element layer 14. Each of the pixels of the pixel array can include two to four sub-pixels as described above. Each of the sub-pixels includes a pixel circuit disposed in the circuit layer 12.

The screen on which the input image is reproduced on the display panel 100 includes the display area DA and the sensing area SA.

Sub-pixels of each of the display area DA and the sensing area SA include pixel circuits. The pixel circuit can include a drive element that supplies a current to the light emitting element OLED, a plurality of switch elements that sample a threshold voltage of the drive element and switch a current path of the pixel circuit, a capacitor that maintains a gate voltage of the drive element, and the like. The pixel circuit is disposed below the light emitting element OLED.

The sensing area SA includes the light transmitting parts AG arranged between the pixel groups PG and an imaging element module 400 disposed below the sensing area SA. The imaging element module 400 photoelectrically converts light incident through the sensing area SA in the imaging mode using the image sensor, converts the pixel data of the image output from the image sensor into digital data, and outputs the captured image data.

The display panel driver writes the pixel data of the input image to the pixels P. The pixels P can be interpreted as a pixel group PG including a plurality of sub-pixels.

The display panel driver includes a drive IC (integrated circuit) 300, which supplies a data voltage of the pixel data to the data lines DL, and a gate driver 120 that sequentially supplies a gate pulse to the gate lines GL. The display panel driver can further include a touch sensor driver that is omitted in the drawings.

The drive IC 300 can adhere to the display panel 100. The drive IC 300 includes a data driver and a timing controller, and receives pixel data of the input image and a timing signal from a host system 200, supplies a data voltage of the pixel data to the pixels, and synchronizes the data driver and the gate driver 120.

The drive IC 300 is connected to the data lines DL through data output channels to supply the data voltage of the pixel data to the data lines DL. The drive IC 300 can output a gate timing signal for controlling the gate driver 120 through gate timing signal output channels. The gate timing signal generated from a timing controller can include a gate start pulse VST, a gate shift clock CKL, and the like.

The host system 200 can be implemented as an application processor (AP). The host system 200 can transmit pixel data of the input image to the drive IC 300 through a mobile industry processor interface (MIPI). The host system 200 can be connected to the drive IC 300 through a flexible printed circuit (FPC).

Meanwhile, the display panel 100 can be implemented as a flexible panel that can be applied to a flexible display. In the flexible display, the size of the screen can be changed by winding, folding, and bending the flexible panel, and the flexible display can be easily manufactured in various designs. The flexible display can be implemented as a rollable display, a foldable display, a bendable display, a slidable display, and the like. The flexible panel can be manufactured as a so-called "plastic OLED panel." The plastic OLED panel can include a back plate and a pixel array on an organic thin film bonded to the back plate. The touch sensor array can be formed on the pixel array.

The back plate can be a polyethylene terephthalate (PET) substrate. The pixel array and the touch sensor array can be formed on the organic thin film. The back plate can block permeation of moisture toward the organic thin film so that the pixel array is not exposed to the moisture. The organic thin film can be a polyimide (PI) substrate. A multi-layered buffer film can be formed of an insulating material on the organic thin film. The circuit layer 12 and the light emitting element layer 14 can be stacked on the organic thin film.

In the display device of the present disclosure, the pixel circuit, the gate driver, and the like arranged on the circuit layer 12 can include a plurality of transistors. The transistors can be implemented as an oxide TFT including an oxide semiconductor, a low temperature poly silicon (LTPS) TFT including an LTPS, and the like. The transistors can be implemented as a p-channel TFT or an n-channel TFT. In the embodiment, an example in which the transistors of the pixel circuit are implemented as the p-channel TFTs is mainly described, but the present disclosure is not limited thereto.

The driving element of the pixel circuit can be implemented as a transistor. In the driving element, although electrical characteristics of all pixels should be uniform, there can be differences between the pixels due to process variations and element characteristic variations and the electrical characteristics can change according to the lapse of display driving time. In order to compensate for the electrical characteristic variations of the driving element, the display device can include an internal compensation circuit and an external compensation circuit.

The internal compensation circuit is added to the pixel circuit in each of the sub-pixels to sample a threshold voltage Vth and/or mobility u of the driving element which changes according to the electrical characteristic of the driving element, and compensate for a change in real time. The external compensation circuit transmits a threshold voltage and/or mobility of the driving element sensed through a sensing line connected to each of the sub-pixels to an external compensation unit. The compensation unit of the external compensation circuit compensates for a change in the electrical characteristic of the driving element by reflecting the sensing result and modulating the pixel data of the input image. The external compensation circuit senses the voltage of the pixel which changes according to the electrical characteristic of the driving element, and compensates for the electrical characteristic variations of the driving elements between the pixels by modulating the data of the input image in an external circuit based on the sensed voltage.

FIG. 5 is a circuit diagram of an example of a pixel circuit to which an internal compensation circuit is applied according to an embodiment of the present disclosure, and FIG. 6 is a diagram illustrating an example of a driving timing of the pixel circuit of FIG. 5.

Referring to FIG. 5, the pixel circuit according to the embodiment of the present disclosure includes the light emitting element OLED, a drive element DT that supplies a current to the light emitting element OLED, and an internal compensation circuit that samples the threshold voltage Vth of the drive element DT using a plurality of switch elements M1 to M6 and compensates for a gate voltage of the drive element DT by the threshold voltage Vth of the drive element DT. Each of the switch elements M1 and M5 can be implemented as a n-channel TFT, Each of the drive element DT and the switch elements M1 to M4 and M6 can be implemented as a p-channel TFT.

The light emitting element OLED can be implemented as an OLED or an inorganic light emitting diode. Hereinafter, an example in which the light emitting element OLED is implemented as an OLED will be described.

The light emitting element OLED can include an organic compound layer formed between an anode and a cathode. The organic compound layer can include a hole injection layer HIL, a hole transport layer HTL, an emission layer EML, an electron transport layer ETL, and an electron injection layer EIL, but the present disclosure is not limited thereto. When a voltage is applied to an anode electrode and a cathode electrode of the OLED, holes passing through the hole transport layer HTL and electrons passing through the electron transport layer ETL are moved to the emission layer EML to form excitons, and thus visible light is emitted from the emission layer EML.

The anode electrode of the light emitting element OLED is connected to the fourth node n4 between the fourth and sixth switch elements M4 and M6. The fourth node n4 is connected to the anode of the light emitting element OLED, a second electrode of the fourth switch element M4, and a second electrode of the sixth switch element M6. The cathode electrode of the light emitting element OLED is connected to a VSS line PL3 to which the low-potential power supply voltage VSS is applied. The light emitting element OLED emits light with a current Ids that flows due to a gate-source voltage Vgs of the drive element DT. A current path of the light emitting element OLED is switched by the third and fourth switch elements M3 and M4.

The drive element DT drives the light emitting element OLED by adjusting the current Ids flowing in the light emitting element OLED according to the gate-source voltage Vgs. The drive element DT includes a gate electrode connected to the second node n2, the first electrode connected to the first node n1, and the second electrode connected to the third node n3.

The storage capacitor Cst is connected between the VDD line PL1 and a second node n2. A data voltage Vdata compensated for by the threshold voltage Vth of the drive element DT is charged to the storage capacitor Cst. Since the data voltage in each of the sub-pixels is compensated for by the threshold voltage Vth of the drive element DT, deviations in characteristics of the drive element DT are compensated for in the sub-pixels.

The first switch element M1 is turned on in response to the gate-on voltage VGH of the $N^{th}$ scanning pulse OSCAN(N) to connect a second node n2 and a third node n3. The second node n2 is connected to a gate electrode of the drive element DT, a first electrode of the storage capacitor Cst, and a first electrode of the first switch element M1. The third node n3 is connected to a second electrode of the drive element DT, a second electrode of the first switch element M1, and a first electrode of the fourth switch element M4. A gate electrode of the first switch element M1 is connected to a first gate line GL1 to receive the $N^{th}$ scanning pulse OSCAN(N). The first electrode of the first switch element M1 is connected to the second node n2, and the second electrode of the first switch element M1 is connected to the third node n3.

The second switch element M2 is turned on in response to the gate-on voltage VGL of the $N^{th}$ scanning pulse PSCAN (N) to supply the data voltage Vdata to the first node n1. A gate electrode of the second switch element M2 is connected to the fourth gate line GL4 to receive the $N^{th}$ scanning pulse PSCAN(N). A first electrode of the second switch element M2 is connected to the first node n1. A second electrode of the second switch element M2 is connected to the data lines DL to which the data voltage Vdata is applied. The first node n1 is connected to the first electrode of the second switch element M2, a second electrode of the third switch element M3, and a first electrode of the drive element DT.

The third switch element M3 is turned on in response to the gate-on voltage VGL of the light emission pulse EM(N) to connect the VDD line PL1 to the first node n1. A gate electrode of the third switch element M3 is connected to a third gate line GL3 to receive the light emission pulse EM(N). A first electrode of the third switch element M3 is connected to the VDD line PL1. The second electrode of the third switch element M3 is connected to the first node n1.

The fourth switch element M4 is turned on in response to the gate-on voltage VGL of the light emission pulse EM(N) to connect the third node n3 to the anode of the light emitting element OLED. A gate electrode of the fourth switch element M4 is connected to the third gate line GL3 to receive the light emission pulse EM(N). The first electrode of the fourth switch element M4 is connected to the third node, and the second electrode of the fourth switch element M4 is connected to the fourth node n4.

The fifth switch element M5 is turned on in response to the gate-on voltage VGH of the $(N-1)^{th}$ scanning pulse OSCAN(N−1) to connect the second node to the Vini line PL2. A gate electrode of the fifth switch element M5 is connected to the second gate line GL2 to receive the $(N-1)^{th}$ scanning pulse OSCAN(N−1). A first electrode of the fifth switch element M5 is connected to the second node n2, and a second electrode of the fifth switch element M5 is connected to the Vini line PL2.

The sixth switch element M6 is turned on in response to the gate-on voltage VGL of the $(N-1)^{th}$ scanning pulse PSCAN(N−1) to connect the Vini line PL2 to the fourth node n4. A gate electrode of the sixth switch element M6 is connected to the fifth gate line GL5 to receive the $(N-1)^{th}$ scanning pulse PSCAN(N−1). A first electrode of the sixth switch element M6 is connected to the Vini line PL2, and the second electrode of the sixth switch element M6 is connected to the fourth node n4.

Referring to FIG. 6, in a pixel circuit according to an embodiment of the present disclosure, both a p-channel thin-film transistor (TFT) and an n-channel TFT are used, the n-channel TFT is low in terms of mobility compared to the p-channel TFT, and thus, OSCAN is set to be wider than PSCAN to secure an initial time margin.

Therefore, an actual sampling period Tsam after an initialization period Tini is equal to a pulse width of the PSCAN rather than a pulse width of the OSCAN. The pixel circuit shown in FIG. 5 can be equally applied to the pixel circuit of the display area DA and the pixel circuit of the sensing area SA but in a sampling period, a voltage charged in a storage capacitor of the display area DA and a voltage charged in a storage capacitor of the sensing area SA, i.e., voltages applied to second nodes n2, can be different from each other.

Therefore, in an embodiment, predetermined design parameters, e.g., a channel ratio of a channel width to a channel length of a driving element and the capacity of a storage capacitor, are differently applied to equalize data ranges of two areas. In this case, the predetermined design parameters can be factors causing influences on a data range between the display area DA and the sensing area SA.

FIGS. 7A and 7B are diagrams for describing a comparison between a channel width and length of a transistor according to an embodiment of the present disclosure, and FIGS. 8A to 8C are diagrams for describing a data range according to design parameters according to an embodiment of the present disclosure.

As shown in FIGS. 7A and 7B, a first channel ratio W1/L1 of a channel width W1 of an active layer ACT between a drain electrode DE and a source electrode SE of a driving element of a pixel circuit in a display area DA to a channel length L1 of the active layer ACT can be set to be less than a second channel ratio W2/L2 of a channel width W2 of an active layer ACT of a driving element of a pixel circuit in a sensing area SA to a channel length L2 of the active layer ACT.

For example, the second channel ratio W2/L2 can be set to be larger by increasing the channel width W2 of the driving element in the sensing area SA or reducing the channel length L2 of the driving element in the sensing area SA as compared to the display area DA.

The amount of current flowing through a channel can vary according to a channel ratio of a driving element, and a current I can be expressed by Equation 1 below.

$$I = \frac{1}{2} \times \left(\mu C_{ox} \frac{W}{L}\right) \times (V_{GS} - V_{TH})^2 \quad \text{[Equation 1]}$$

Here, Vas denotes a gate-source voltage of the driving element, Cox denotes a capacitance of an oxide material and VTH denotes a threshold voltage of the driving element.

As shown in Equation 1, as the channel ratio of the driving element increases, the amount of current flowing through the channel can increase. A charging rate of a storage capacitor can vary due to an influence of the current, and a charging rate $\tau_{charging}$ can be expressed by Equation 2 below.

$$\tau_{charging} = \frac{1}{R \times C_{st}} \quad \text{[Equation 2]}$$

Here, R denotes a resistance of a channel, and Cst denotes the capacity of a storage capacitor.

As shown in Equation 2, when the current increases, the resistance decreases, thus increasing the charging rate of the storage capacitor. For example, as shown by the voltage change at the second node N2 in FIG. 8A, the charging rate of the storage capacitor in the sensing area SA that is set to be larger in a channel ratio than that in the display area DA is high.

The difference between the charging rates of the storage capacitors results in the difference between data ranges of the display area DA and the sensing area SA as shown in FIG. 8B, which can cause a deviation. For example, a data range DR1 of a sensing area SA(W/L×1) and a data range DR2 of a sensing area SA(W/L×4) for which a channel ratio is adjusted are not the same as a data range DR0 of the display area DA.

Accordingly, the capacity of the storage capacitor in Equation 2 is adjusted to equalize the charging rates of the storage capacitors in the display area DA and the sensing area SA.

A capacitance Cst2 of the storage capacitor of the pixel circuit in the sensing area SA in which the charging rate of the storage capacitor is relatively high can be set to be greater than a capacitance Cst1 of the storage capacitor of the pixel circuit in the display area DA.

In an embodiment, a ratio between the first channel ratio of the driving element of the pixel circuit in the display area DA and the second channel ratio of the driving element of the pixel circuit in the sensing area SA can be 1:n (n is a positive value greater than 1 (for example a positive integer)), a ratio between the first capacity Cst1 of the storage capacitor of the pixel circuit in the display area DA and the second capacity Cst2 of the storage capacitor of the pixel circuit in the sensing area SA can be 1:m (m is a positive value greater than 1 (for example a positive integer)), and n=m.

For example, first channel ratio:second channel ratio=1:4, and first capacity:second capacity=1:4.

In this case, a channel ratio and the capacity of a capacitor in the sensing area SA can be adjusted on the basis of a channel ratio and the capacity of a capacitor in the display area DA, and the channel ratio and the capacity of the capacitor in the display area DA can be adjusted.

Here, as shown in FIG. 5, a case in which the capacity of a storage capacitor of a pixel circuit of a display device in which a part of the pixel circuit is embodied as an oxide thin-film transistor (TFT) including an oxide semiconductor will be described as an example. In an embodiment, switch elements, i.e., a first switch element M1 and a fifth switch element M5 which are connected to gate electrodes of driving elements, are oxide TFTs to reduce a leakage component and thus a capacity of a storage capacitor can be designed to be small. Therefore, a channel ratio and a capacity of a capacitor can be designed more easily.

However, embodiments of the present disclosure are not necessarily limited thereto and can be applied to a display device with various types of transistors.

For example, when the pixel circuit is embodied only as a low-temperature polycrystalline silicon (LTPS) TFT including low-temperature polysilicon, leakage characteristics may not be good due to characteristics of the LTPS TFT and thus the capacity of the storage capacitor should be designed to be high as possible so that data of one frame can be maintained as much as possible.

Therefore, as shown in FIG. 5, it is more advantageous to implement a part of the pixel circuit as an oxide TFT including an oxide semiconductor than to implement the pixel circuit only as an LTPS TFT including low-temperature polysilicon.

The capacity of the storage capacitor can vary according to a resolution of the sensing area SA. For example, a difference between the first and second capacities is proportional to a difference between the first and second resolutions.

First, in the case of a mobile product, a storage capacitor is formed by connecting a plurality of capacitors in parallel to adjust an entire capacity of the storage capacitor because pixels per inch (PPI) is high and a design margin of a sensing area is not large compared to an information technology (IT) product.

On the other hand, in the case of the IT product, PPI is lower than and a design margin of a sensing area is far larger than those of the mobile product and thus it is possible to halve a capacity of a capacitor in a display area and double a capacity of a capacitor in a sensing area. For example, as described above in the embodiment, it is possible to design such that both the capacity of the storage capacitor in the sensing area and the capacity of the storage capacitor in the display area can be adjusted.

Particularly, IT products are generally manufactured in a landscape form that is long in a horizontal direction but mobile products are generally manufactured in a portrait form that is long in a vertical direction. An IT product that is in the landscape form is advantageous in terms of high-speed driving, because a storage capacitor can be designed to be smaller and thus a charging time can be set to be shorter than that of a mobile product that is in the portrait form.

As shown in FIG. 8C, a data range DR2 of a sensing area SA(W/L×4) for which only a channel ratio is adjusted is not the same as a data range DR0 of a display area DA. On the other hand, when channel ratios of driving elements and capacities of storage capacitors are adjusted, a charging rate of the storage capacitor in the display area DA and a charging rate of the storage capacitor in the sensing area SA become the same and thus the data range DR0 of the display area DA and a data range DR3 of the sensing area SA(W/L×4+Cst×4), for which the channel ratio and the capacity of the capacitor are adjusted, become the same due to the same charging rates.

As such, when data ranges are identical to each other, the influence of noise generated due to IR drop or kickback can decrease, an analog voltage margin can be secured unlike the conventional case, and a compensation margin (e.g., a data up/down compensation margin) of each IP for removing an in-plane deviation can be secured.

FIGS. 9A to 9D are diagrams for describing a pixel structure in which a channel ratio and a capacity are adjusted according to an embodiment of the present disclosure.

More specifically, FIG. 9A illustrates a driving element and a storage capacitor in a display area DA of a comparative example. Here, a case in which the storage capacitor overlaps the driving element is provided as an example but embodiments are not limited thereto and the storage capacitor can be arranged not to overlap the driving element.

In this case, a channel ratio can be determined by an active layer of the driving element. Here, the active layer is formed in a curved shape and has a channel length and a channel width.

FIG. 9B illustrates an example in which a channel ratio of a driving element and a capacity of a storage capacitor that are disposed in a sensing area SA according to an embodiment are changed. For example, an active layer of the driving element can be manufactured in a non-curved form that is short in length and large in width to increase a channel ratio, and a total capacity of the storage capacitor can be increased by additionally connecting a capacitor C to be parallel to the storage capacitor.

There is a spatial limitation in increasing a capacity of the storage capacitor, and thus the total capacity of the storage capacitor is increased by connecting an additional capacitor to the storage capacitor.

As shown in FIGS. 9C and 9D, a total capacity of a storage capacitor Cst can be increased by connecting a first capacitor C1 and a second capacitor C2, which are additional capacitors C, in parallel to the storage capacitor Cst. Here, an example of a case in which two capacitors are connected to a storage capacitor is described, but embodiments are not limited thereto and at least one capacitor can be connected parallel to the storage capacitor.

A bottom shield metal (BSM) is deposited on a substrate 10, a first buffer layer BUF1 is formed on the BSM layer, and a first gate insulating film GI1 is formed on the first buffer layer BUF1.

An active layer ACT is formed on the first gate insulating film GI1, a first gate electrode GAT1 is formed on the active layer ACT, a first intermediate insulating film ILD1 is formed on the first gate electrode GAT1, and a second gate electrode GAT2 is formed on the first intermediate insulating film ILD1.

A second buffer layer BUF2 is formed on the second gate electrode GAT2, a second gate insulating film GI2 is formed on the second buffer layer BUF2, a second intermediate insulating film ILD2 is formed on the second gate insulating film GI2, and a metal layer SD is formed on the second intermediate insulating film ILD2.

In this case, the metal layer SD includes a first metal layer SD1 connected to the first gate electrode GAT1 and a second metal layer SD2 connected to the second gate electrode GAT2. The first metal layer SD1 and the second metal layer SD2 are formed of the same metal layer but are patterned and thus different voltages can be applied thereto. For example, referring to FIG. 5, a voltage of a second node n2 is applied to the first metal layer SD1, and a high-potential supply voltage VDD is applied to the second metal layer SD2.

Here, the storage capacitor Cst is formed by the first gate electrode GAT1 and the second gate electrode GAT2, and the first capacitor C1 and the second capacitor C2 are connected in parallel to the storage capacitor Cst as shown in FIG. 9D.

The first capacitor C1 can be formed by the first gate electrode GAT1 and the second gate electrode GAT2, and the second capacitor C2 can be formed by the first gate electrode GAT1 and the BSM. In this case, a high-potential supply voltage VDD is applied to the BSM.

FIG. 10 is a diagram illustrating a result of simulating a charging rate of a pixel circuit according to an embodiment of the present disclosure.

Particularly, FIG. 10 illustrates a change in voltage charged in a storage capacitor in a pixel circuit in each of a display area DA and a sensing area SA according to a channel ratio and a capacity of a capacitor. A storage capacitor Cst of a pixel circuit of an organic light-emitting diode (OLED) display device of FIG. 5 is designed to maintain a voltage of a second node n2, which changes due to a leakage component for a frame period, as much as possible to emit light of a certain luminance level for one frame period. Therefore, a voltage charged in a storage capacitor should be hereinafter understood to mean a voltage of a second node.

For example, in comparison with the voltage Vda charged in the storage capacitor of the pixel circuit in the display area DA, a rate of charging a storage capacitor of a pixel circuit, which is included in the sensing area SA(W/L×4) for which only a channel ratio of a driving element is increased four times, with a voltage Vsa1 is high as shown in an enlarged part A, and thus the voltage Vsa1 can reach a high point earlier when the same data voltage is applied.

On the other hand, a rate of charging a storage capacitor of a pixel circuit, which is included in the sensing area SA(W/L×4+Cst×4) for which both a channel ratio of a driving element and the capacity of the storage capacitor are increased four times, with a voltage Vsa2 is the same as the rate of charging the storage capacitor with the voltage Vda and thus the voltage Vsa2 and the voltage Vda can reach the same point when the same data voltage is applied.

Here, a line representing the voltage Vda2 of the sensing area SA(W/L×4+Cst×4) and a line representing the voltage Vda of the display area DA almost coincide each other but are drawn to be shown side by side for clarity.

Therefore, even when the channel ratio of the driving element and the capacity of the storage capacitor of the pixel circuit in the sensing area SA (W/L×4+Cst×4) are adjusted, a charging rate of the sensing area SA (W/L×4+Cst×4) is the same as a charging rate of the display area DA and thus the same charging time can be set for the display area DA and the sensing area SA (W/L×4+Cst×4).

In this case, an increase of the capacity of a capacitor results in a change of the amount of kickback and thus a point at which a voltage charged in a storage capacitor arrives can vary at a point in time when an $N^{th}$ scan signal OSCAN(n) falls. For example, as shown in an enlarged part B, the voltage Vsa2 of the sensing area SA (W/L×4+Cst×4) drops to be substantially the same as the voltage Vsa1 of the sensing area SA (W/L×4) rather than the voltage Vda of the display area DA.

Therefore, in an embodiment, a structure of a pixel circuit for adjusting the amount of kickback is suggested.

FIG. 11 is a circuit diagram of another example of a pixel circuit to which an internal compensation circuit is applied according to an embodiment of the present disclosure, and FIG. 12 is a diagram illustrating a result of simulating a charging rate of a pixel circuit according to another embodiment of the present disclosure.

Referring to FIG. 11, a pixel circuit according to another embodiment of the present disclosure includes an OLED, a driving element DT that supplies a current to the OLED, a plurality of switch elements M1 to M6, a storage capacitor Cst, and an auxiliary capacitor Ca. Here, each of the switch elements M1 and M5 can be embodied as an n-channel TFT, and each of the driving element DT and the other switch elements M2 to M4 and M6 can be embodied as a p-channel TFT.

The pixel circuit has the same configuration and function as those of the pixel circuit of FIG. 5 excluding that the auxiliary capacitor Ca is additionally provided, and thus, a detailed description thereof will be omitted here.

The auxiliary capacitor Ca is connected between a gate electrode and a first electrode of the first switch element M1.

In addition, an increase of the capacity of the storage capacitor Cst results in a change of a kickback voltage, thus causing a data shift phenomenon. For example, as shown in the enlarged part B of FIG. 10, the voltage Vsa2 of the sensing area SA (W/L×4+Cst×4) for which the channel ratio and the capacity of the capacitor capacity are adjusted does not drop to be substantially the same as the voltage Vda of the display area DA, thus resulting in the data shift phenomenon.

Therefore, in the embodiment, the auxiliary capacitor Ca is added to adjust the kickback voltage. As shown in FIG. 12, it can be seen that a voltage of a sensing area SA (W/L×4+Cst×4+Ca) to which the auxiliary capacitor Ca is added drops to be substantially the same as a voltage of a display area DA. For example, an influence caused by kickback can be controlled by adding the auxiliary capacitor Ca. Here, the voltage of the sensing area SA (W/L×4+Cst×4+Ca) and the voltage of the display area DA are drawn with two lines that almost coincide with each other but for clarity, the two lines are shown side by side.

For example, the voltage of the sensing area SA (W/L×4+Cst×4) for which only a channel ratio and the capacity of a capacitor are adjusted does not drop to be substantially the same as the voltage of the display area DA but the voltage of the sensing area SA (W/L×4+Cst×4+Ca) to which the auxiliary capacitor Ca is added drops to be substantially the same as the voltage of the display area DA.

FIG. 13 is a diagram illustrating an overall configuration of a display device according to a second embodiment of the present disclosure.

Referring to FIG. 13, the display device according to the second embodiment of the present disclosure includes a display panel 100 in which a pixel array is disposed on a screen, a display panel driving part, and the like. The screen of the display panel 100 on which an input image is reproduced includes a display area DA and a plurality of sensing areas SA1 and SA2.

The sensing area SA1 includes light-transmitting parts between pixel groups, and an imaging element module below the sensing area SA1. In an imaging mode, the imaging element module performs photoelectric conversion on light incident through the sensing area SA1 using an image sensor, and converts pixel data of an image output from the image sensor into digital data to output captured image data.

The sensing area SA2 includes pixels to which pixel data is written, and sensor pixels spaced a certain distance from each other with the pixels interposed therebetween. The sensor pixels include photosensors, and a photosensor driving circuit that drives the photosensors. Display pixels in the sensing area SA2 emit light in a display mode according to a data voltage of pixel data to display input data, and emit light at a high luminance level according to a voltage of light source driving data and thus is driven as a light source in a fingerprint recognition mode.

As described above, it can be possible to adjust a channel ratio and the capacity of a capacitor according to an embodiment of the present disclosure even in a display device to which both an imaging element module and a fingerprint recognition module are applied.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto.

Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel circuit comprising:

a first pixel circuit arranged in a first area of a screen at a first resolution, the first pixel circuit including a first driving element configured to supply a current to a first light-emitting element, a first-first switch element connected between a gate electrode of the first driving element and a second electrode of the first driving element, a first-second switch element connected between a first electrode of the first driving element and a data line, and a first storage capacitor disposed between the gate electrode of the first driving element and a power line to which a high-potential supply voltage is applied; and a second pixel circuit arranged in a second area of the screen at a second resolution lower than the first resolution, the second pixel circuit including a second driving element configured to supply a current to a second light-emitting element, a second-first switch element connected between a gate electrode of the second driving element and a second electrode of the second driving element, a second-second switch element connected between a first electrode of the second driving element and a data line, and a second storage capacitor disposed between the gate electrode of the second driving element and the power line to which the high-potential supply voltage is applied, wherein, the first-first switch element and the second-first switch element are n-channel thin-film transistors (TFTs), and the first-second switch element and the second-second switch element are p-channel TFTs, wherein, a pulse width of a scan pulse applied to the first-first switch element and the second-first switch element is set to be wider than a pulse width of a scan pulse applied to the first-second switch element and the second-second switch element, wherein a second capacity of the second storage capacitor is greater than a first capacity of the first storage capacitor, wherein a second channel ratio of the second driving element is greater than a first channel ratio of the first driving element, wherein the first channel ratio is a first channel width of a first active layer of the first driving element divided by a first length of the first channel, and wherein the second channel ratio is a second channel width of a second active layer of the second driving element divided by a second length of the second channel.

2. The pixel circuit of claim 1, wherein a ratio of the first channel ratio to the second channel ratio is about 1:n, where n is a positive integer greater than 1, and a ratio of the first capacity to the second capacity is about 1:m, wherein m is a positive integer greater than 1 and n=m.

3. The pixel circuit of claim 1, wherein a difference between the first and second capacities is proportional to a difference between the first and second resolutions.

4. The pixel circuit of claim 3, wherein the second storage capacitor comprises a plurality of capacitors connected in parallel.

5. The pixel circuit of claim 1, wherein the second pixel circuit further comprises:

an auxiliary capacitor connected between the gate electrode of the second driving element and a gate electrode of the second-first switch element.

6. The pixel circuit of claim 1, wherein a charging time of the first storage capacitor is substantially equal to a charging time of the second storage capacitor.

7. The pixel circuit of claim 1, wherein the first active layer is longer than the second active layer, and the first active layer has a curved shape.

8. The pixel circuit of claim 1, wherein the second width of the second active layer is greater than the first width of the first active layer.

9. The pixel circuit of claim 1, wherein the second storage capacitor includes a first capacitor, a second capacitor and a third capacitor connected in parallel, and wherein a portion of the third capacitor overlaps with the first capacitor.

10. The pixel circuit of claim 1, wherein the first light-emitting of the first pixel circuit and the second light-emitting of the second pixel circuit emit a same color of light.

11. A display device comprising:

a display panel including a plurality of pixel circuits arranged in a first area and a second area of the display panel at different resolutions, wherein the plurality of pixel circuits comprise:

a first pixel circuit arranged in the first area at a first resolution, the first pixel circuit including a first driving element configured to supply a current to a first light-emitting element, a first-first switch element connected between a gate electrode of the first driving element and a second electrode of the first driving element, a first-second switch element connected between a first electrode of the first driving element and a data line, and a first storage capacitor disposed between the gate electrode of the first driving element and a power line to which a high-potential supply voltage is applied; and a second pixel circuit arranged in the second area at a second resolution lower than the first resolution, the second pixel circuit including a second driving element configured to supply a current to a second light-emitting element, a second-first switch element connected between a gate electrode of the second driving element and a second electrode of the second driving element, a second-second switch element connected between a first electrode of the second driving element and a data line, and a second storage capacitor disposed between the gate electrode of the second driving element and the power line to which the high-potential supply voltage is applied, wherein, the first-first switch element and the second-first switch element are n-channel thin-film transistors (TFTs), and the first-second switch element and the second-second switch element are p-channel TFTs, wherein, a pulse width of a scan pulse applied to the first-first switch element and the second-first switch element is set to be wider than a pulse width of a scan pulse applied to the first-second switch element and the second-second switch element, wherein a second capacity of the second storage capacitor is greater than a first capacity of the first storage capacitor, wherein a second channel ratio of the second driving element is greater than a first channel ratio of the first driving element, wherein the first channel ratio is a first channel width of a first active layer of the first driving element divided by a first length of the first channel, and wherein the second channel ratio is a second channel width of a second active layer of the second driving element divided by a second length of the second channel.

12. The display device of claim 11, wherein a ratio of the first channel ratio to the second channel ratio is about 1:n, where n is a positive integer greater than 1, and a ratio of the first capacity to the second capacity is about 1:m, wherein m is a positive integer greater than 1 and n=m.

13. The display device of claim 11, wherein a difference between the first and second capacities is proportional to a difference between the first and second resolutions.

14. The display device of claim 13, wherein the second storage capacitor comprises a plurality of capacitors connected in parallel.

15. The display device of claim 11, wherein the second pixel circuit further comprises:

a switch element connected between the gate electrode of the second driving element and a source electrode of the second driving element; and an auxiliary capacitor connected between the gate electrode of the second driving element and a gate electrode of the switch element.

16. The display device of claim 11, wherein a charging time of the first storage capacitor is substantially equal to a charging time of the second storage capacitor.

17. The display device of claim 11, wherein the first active layer is longer than the second active layer, and the first active layer has a curved shape.

18. The display device of claim 11, wherein the second width of the second active layer is greater than the first width of the first active layer.

19. The display device of claim 11, wherein the second storage capacitor includes a first capacitor, a second capacitor and a third capacitor connected in parallel, and wherein a portion of the third capacitor overlaps with the first capacitor.

20. The display device of claim 11, wherein the first light-emitting of the first pixel circuit and the second light-emitting of the second pixel circuit emit a same color of light.

* * * * *